(12) United States Patent
Coon

(10) Patent No.: US 6,894,876 B1
(45) Date of Patent: May 17, 2005

(54) MICROACTUATED SUSPENSION WITH SHEAR TRANSMISSION OF FORCE

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 259 days.

(21) Appl. No.: 10/210,409

(22) Filed: Jul. 31, 2002

Related U.S. Application Data

(60) Provisional application No. 60/309,825, filed on Aug. 1, 2001.

(51) Int. Cl.[7] .............................................. G11B 21/24
(52) U.S. Cl. .................................................. 360/294.4
(58) Field of Search .......................... 360/294.4, 291.9, 360/292

(56) References Cited

U.S. PATENT DOCUMENTS 6,031,317 A * 2/2000 Chen .......................... 310/329

OTHER PUBLICATIONS

Koganezawa et al, S., Dual–Stage Actuator System for Magnetic Disk Drives Using a Shear Mode Piezoelectric Microactuator, Mar. 1999, IEEE Transactions on Magnetics, vol. 35, No. 2, □□pp. 988–992.*

* cited by examiner

Primary Examiner—George J. Letscher
(74) Attorney, Agent, or Firm—Louis J. Bachand

(57) ABSTRACT

A microactuator suspension assembly has a load beam structure with at least three layers of material in certain portions of the proximal area between the baseplate area and the spring area, the first and third layers comprising substantially inextensible metal, the second layer comprising extensible plastic, the plastic layer operating in shear when driven by an electrodynamically variable microactuator to make a microadjustment of the suspension.

23 Claims, 3 Drawing Sheets

MICROACTUATED SUSPENSION WITH SHEAR TRANSMISSION OF FORCE

RELATED APPLICATION

This application claims the benefit of U.S. Provisional Application Ser. No. 60/309,825, filed Aug. 1, 2001.

STATEMENT REGARDING FEDERALLY SP3NSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to such suspensions having microactuated movement transmitted between proximal and distal portions via relative movement between outer layers of a laminate bonded to a common inner layer that moves in shear to accommodate the relative movement. Attachment of the proximate portion to one outer layer and the distal portion to the other outer layer and effecting a relative shift in these layers with a microactuator coupled to both outer layers will shift the distal portion relative to the proximate portion and make a microadjustment of the suspension. The microactuator extends through the plane of the laminate to attach to oppositely facing outer layer surfaces.

2. Description of the Related Art

Microactuated suspensions are able to microadjust for better tracking on a disk. One or two microactuators are used coupled between the fixed and the movable portions of a suspension to effect relative movement of these portions. The movement is achieved by bending one or both of the metal members that define the proximate and distal portions. The energy required to do this is a design limitation. The reduction in metal thickness in the area of bending is a further design problem.

BRIEF SUMMARY OF THE INVENTION

With reduced size of suspensions and new materials, such as laminates, being used, e.g. as flexible circuits and as circuit supports, that do not lend themselves to conventional microactuation approaches, the invention adapts these new materials and combines them with microactuators to take advantage of their unique properties to better effect microactuation at lower cost of manufacture, and to minimize design compromises in the suspension parts.

It is an object, therefore, to provide a disk drive suspension using a laminate of first and second metal outer layers and a middle layer comprised of plastic such as polyimide. It is a further object to provide microactuation using as a typical laminate one comprised of a first outer layer of stainless steel about 0.0012 inch thick, a middle layer of plastic such as about 0.008 inch polyimide, and a second outer layer of stainless steel about 0.002 inch thick. It is a further object to form a suspension member of a three layer laminate, using one outer layer as or connected to the proximate portion of the suspension, the other outer layer as or connected to the suspension distal portion, coupling microactuators to the two outer layers while traversing the middle layer, and effecting relative movement between the outer layers without bending metal parts, only elongating or contracting the plastic middle layer, to cause microadjustment between the outer layers and thus the proximate and distal portions. It is a further object to provide a new microadjustment system for microactuated suspensions. The relatively thick middle layer, combined with its low modulus of elasticity, means that the microactuating PZTs (piezoelectric crystals) can drive the motion in shear mode instead of bending mode.

These and other objects of the invention to become apparent hereinafter are realized in a microactuated disk drive suspension comprising a first outer layer-plastic layer-second outer layer laminate, the plastic layer extending in a plane, a dimensionally variable microactuator having first and second end regions and a middle region extending through the plastic layer plane, the first and second outer layers mounting the microactuator by the first and second end regions respectively, whereby dimensional variations in the microactuator relatively shift the outer layers as a function of plastic layer movement in shear.

In this and like embodiments, typically, the first outer layer comprises a metal, the second outer layer comprises a metal, or both the first and second outer layers comprise metal, at least one of the first and second outer layers comprises a conductive metal, such as stainless steel, aluminum and copper, the plastic layer material is a synthetic organic polymer, such as one comprising repeating imide or acrylic moieties, there is a second microactuator having first and second end regions, and a middle region extending through the plane of the plastic layer, the suspension is combined with a flexible circuit, the laminate is apertured to pass the microactuator through the plastic layer plane.

In a further embodiment, the invention provides a microactuated disk drive suspension comprising a laminate of a first metal layer, a second metal layer and a synthetic organic plastic layer fixed therebetween, the plastic layer having a first surface fixed to the first metal layer and a second surface fixed to the second metal layer, the plastic layer having a thickness permitting relative movement between the first and second surfaces, a longitudinally dimensionally variable electrodynamic microactuator having first and second end regions and a middle region therebetween, the microactuator being fixed at its first end region to the first metal layer and at its second end region to the second metal layer with its middle region passing through the plastic layer, whereby microactuator dimensional variations shift the first metal layer relative to the second metal layer as a function of relative movement within the plastic layer between the first and second metal layers.

In a further embodiment, the invention provides a microactuated disk drive suspension member having proximate and distal portions and comprising a laminate of first and second substantially inextendable outer layers and a substantially extendable third inner layer dimensionally responsive to shearing forces, the member having an aperture with spaced distal and proximate edge margins in the first outer layer and spaced distal and proximate edge margins in the second outer layer, the first and second outer layers defining on their respective distal and proximate edge margins oppositely facing attachment regions, a microactuator structure that traverses the plane of the inner layer, the microactuator structure having first and second end regions fixed to respective first and second outer layer distal and proximate edge margins so as to act between the first and second outer layers with the third inner layer response to shearing forces to shift the member distal portion relative to the member proximate portion.

In this and like embodiments, typically, the first outer layer comprises a metal, and or the second outer layer comprises a metal, and third inner layer comprises a plastic material such as a synthetic organic polymer comprising repeating imide or acrylic moieties, the metal layers can comprise a conductive metal such as stainless steel, aluminum or copper, the member is combined with a microactuator, and or a flexible circuit, the member is combined with a pair of laterally spaced microactuators, the aperture is generally rectangular, and the member is combined with a flexible circuit.

In a further embodiment, the invention provides a disk drive suspension comprising a flexible circuit comprising a laminate of at least one pair of conductors, an insulative film and a support layer that defines a flexure, and an elongated member supporting the flexible circuit, the elongated member having a proximal end adapted to be mounted to an actuator and a distal end supporting the flexure to carry a read/write head in operating proximity to a disk, the member comprising an assembly of juxtaposed first and second layers that are substantially inextendable by shear forces, at least one of the first and second layers being coupled to the distal end, and a third layer between and attached to both the first and second layers, the third layer being longitudinally variable in response to shear forces, and an elongated microactuator arranged to relatively move the first and second layers in shear force imparting relation to the third layer to relatively shift the first and second layers and thereby correspondingly shift the distal end carried head relative to the disk.

In yet another embodiment, the invention provides a microactuated disk drive suspension for supporting a read/write head at a disk, the suspension comprising an elongated member comprising a laminate of first and second outer layers of substantially inextendable material and a third inner layer of substantially extendable material bonded to the first and second outer layers, the member having a proximate portion adapted to attach the member to an actuator, a distal portion adapted to support the read/write head, and an intermediate portion connected between the proximate and distal portions; and microactuator structure attached to the intermediate portion and connected to the first and second outer metal layers for shifting the first and second outer metal layers relative to each other with the response to shear forces of the inner layer in a manner shifting the distal portion-carried read/write head relative to the disk.

In this and like embodiments, typically, at least one of the outer layers is comprised of metal such as stainless steel, copper or aluminum, the member proximate portion comprises the first outer layer, the member distal portion comprises the second outer layer, the member distal portion further comprises the third inner layer, the third inner layer comprising plastic, the member distal portion further comprises the first outer layer, the first outer layer comprising a metal, there is also included a spring portion fixed between the proximate and the distal portions, and there is further included a flexible circuit laminate comprising conductive traces, an insulative film layer and a metal support layer, the metal support layer defining the spring portion.

Further in this and like embodiments, there is included a spring portion having a proximate part and a distal part, the second outer layer having a distal part fixed to the proximate part of the spring portion, the second outer layer distal part acting on the spring portion distal part through the spring portion in response to relative movement of the first outer layer and the second outer layer across the third inner layer effected by the microactuator, and there is also included a flexible circuit laminate of conductive traces, an insulative film layer and a metal support layer, the metal support layer defining the spring portion.

In a further embodiment, the invention provides a microactuated disk drive suspension for supporting a read/write head at a disk, the suspension comprising an elongated member comprising a laminate of first and second outer metal layers and a third inner layer of substantially extendable plastic material bonded to the first and second outer layers, the member having a proximate portion adapted to attach the member to an actuator, the proximate portion having a generally planar central area and defining in the central area a structure for attaching the member to an actuator arm, the proximate portion having left and right edge rails rising from the central area; the member having a distal portion adapted to support the read/write head, and an intermediate portion connected between the proximate and distal portions, the intermediate portion comprising the laminate layers shaped to define left and right raised edges.

In a further embodiment, there is provided a microactuator suspension assembly comprising a load beam structure having side rails and comprising at least three layers of material in certain portions of the proximal area between the baseplate area and the spring area, the first and third layers comprising substantially inextensible metal, the second layer comprising extensible plastic, the plastic layer operating in shear when driven by an electrodynamically variable microactuator to extend or contract the length of the side rails.

In its method aspects, the invention provides a method of shifting a slider at a disk including carrying the slider on a suspension rigid portion, providing the rigid portion from a metal layer of a laminate having two metal layers and plastic layer therebetween having movement in response to shear forces, coupling the two metal layers together with a microactuator extending through the plane of the plastic layer, and oppositely driving the rigid portion metal layers responsive to movement in shear in the plastic film layer to shift the slider at the disk with the microactuator.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
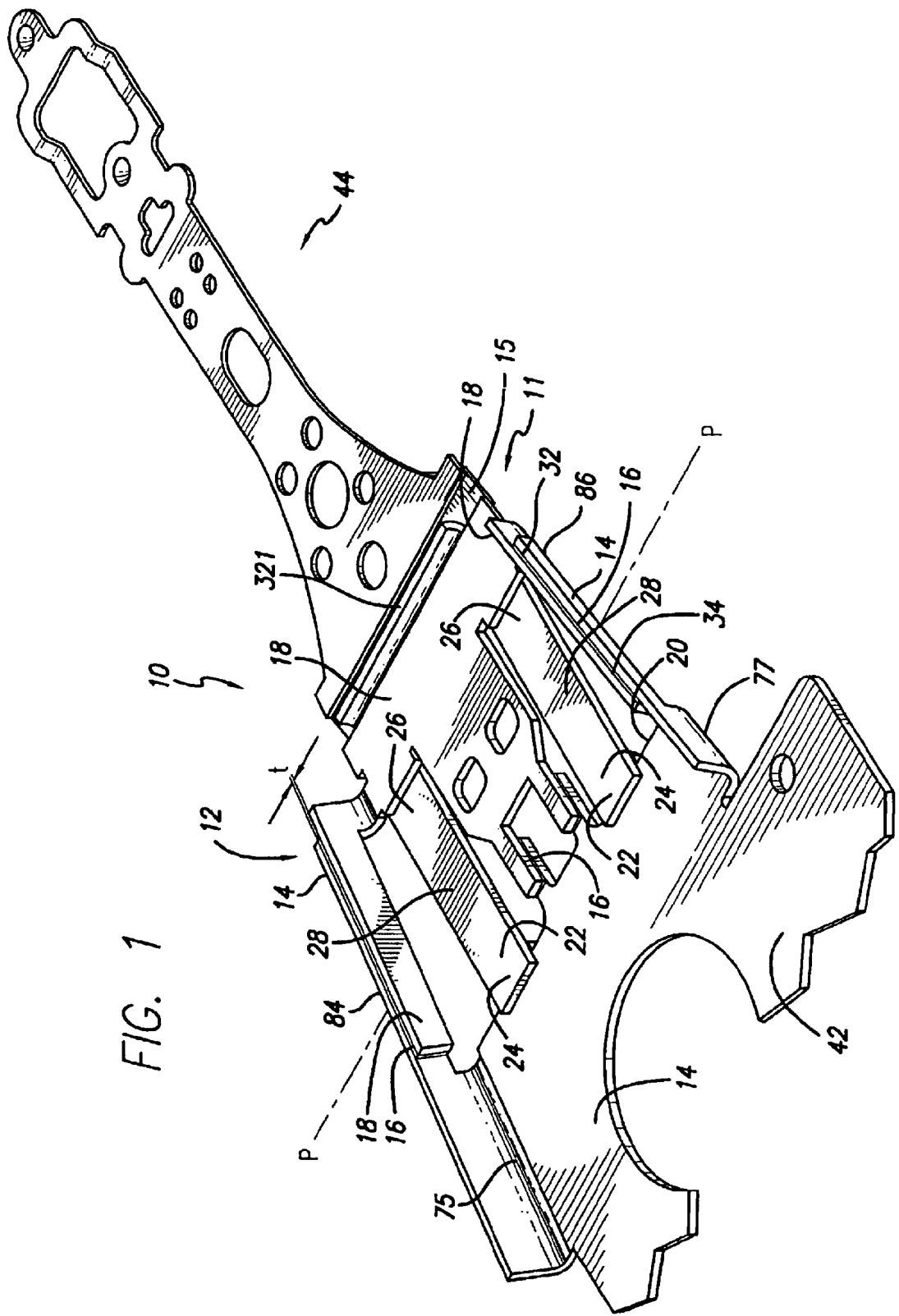
FIG. 1 is an oblique view of the invention suspension member.

With reference now to the drawings in detail, in FIG. 1 microactuated disk drive suspension 10 comprises a laminate 12 of a first outer layer 14, a middle plastic layer 16, and a second outer layer 18. Plastic layer 16 extends in a plane P. A dimensionally variable microactuator 22, attached to laminate 12 has first and second end regions 24, 26, respectively, and a middle region 28 extending through the plastic layer plane P. First and second outer layers 14, 18 mount the microactuator 22, comprising one or two microactuators, as shown, by first and second end regions 24, 26 respectively, so that dimensional variations in the microactuator relatively shift the outer layers as a function of plastic layer 16 movement in shear.

First and second outer layer 14 typically comprise a metal, such as a conductive metal, e.g. stainless steel, aluminum or copper. The plastic layer 16 material is typically a synthetic organic polymer, such as one comprising repeating imide or acrylic moieties. Laminate 12 is apertured at 20 to pass the microactuator 22 through the plastic layer plane P.

The plastic layer 16 has a first surface 32 fixed to the first metal layer 14 and a second surface 34 fixed to the second metal layer 18. Plastic layer 16 has a thickness t permitting relative movement between the first and second surfaces as a function of the movement of metal layers 14, 18 attached to those surfaces. The longitudinally dimensionally variable electrodynamic microactuator 22 is fixed at its first end region 24 to the first metal layer 14 and at its second end region 26 to the second metal layer 18 with its middle region 28 passing through the plane of the plastic layer 16. Microactuator 22 dimensional variations shift the first metal layer 14 relative to the second metal layer 18 as a function of relative movement within the plastic layer 16 between first and second metal layers to shift suspension distal portion 44 accordingly by force against suspension spring portion distal part 15.

Figure 2:
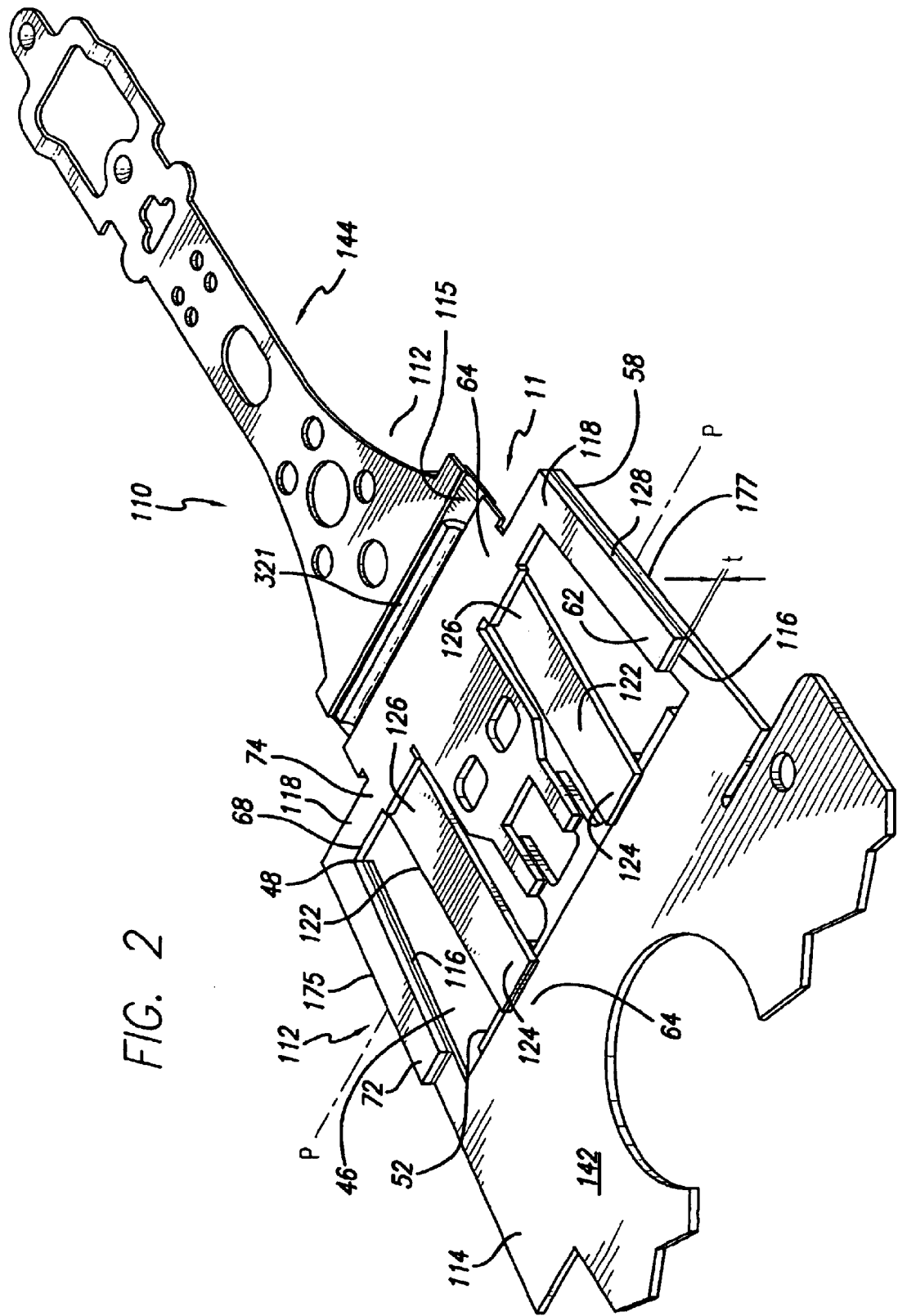
FIG. 2 is an oblique view of the invention suspension member in another embodiment; and, FIG. 3 is a bottom plan view of the suspension in a further embodiment.

With reference to FIG. 2, wherein like parts have like numeral plus 100, microactuated disk drive suspension member 110 has proximate and distal portions 142, 144, respectively, each comprising a laminate 112 of first and second substantially inextendable outer layers 114, 118, and a substantially extendable third inner layer 116 dimensionally responsive to shearing forces. Suspension member 110 has a generally rectangular aperture 46 with a distal edge margin 48 and spaced therefrom a proximate edge margin 52 in the first outer layer 114. Suspension member 110 further has distal edge margin 68 and proximate edge margin 72 in the second outer layer 118. First and second outer layers 114, 118 define on their respective distal and proximate edge margins 58, 62, 68, 72 oppositely facing attachment regions 64, 74. Microactuator structure 122 traverses the plane P of the inner layer 116, having first and second end regions 124, 126 fixed to respective first and second outer layer distal and proximate edge margins 58, 62, 68, 72 so as to act between the first and second outer layers 114, 118 with the third inner layer 116 response to shearing forces to shift the member distal portion 142 relative to the member proximate portion 144. Suspension member 110 is typically combined with microactuators 122, typically laterally spaced as shown, and a flexible circuit 82 (FIG. 3), hereinafter more particularly described.

FIG. 1 shows the metal layers 14, 18 bent at their left and right edge margins 75, 77 to form rails 84, 86. In this embodiment, the metal layers 14, 18 are cut away in the proximate and distal portions 42, 44 so that the laminate is left in the rails 84, 86, thus concentrating in middle layer 16 the shear forces resulting from opposite longitudinal movements in first and second outer layers 14, 18 under dimensional elongation or contraction of the microactuators 22.

In FIG. 2, the edge margins 175, 177 of metal layers 114, 118 are flat, not bent into rails, and adhered to one another by middle layer 116.

Figure 3:
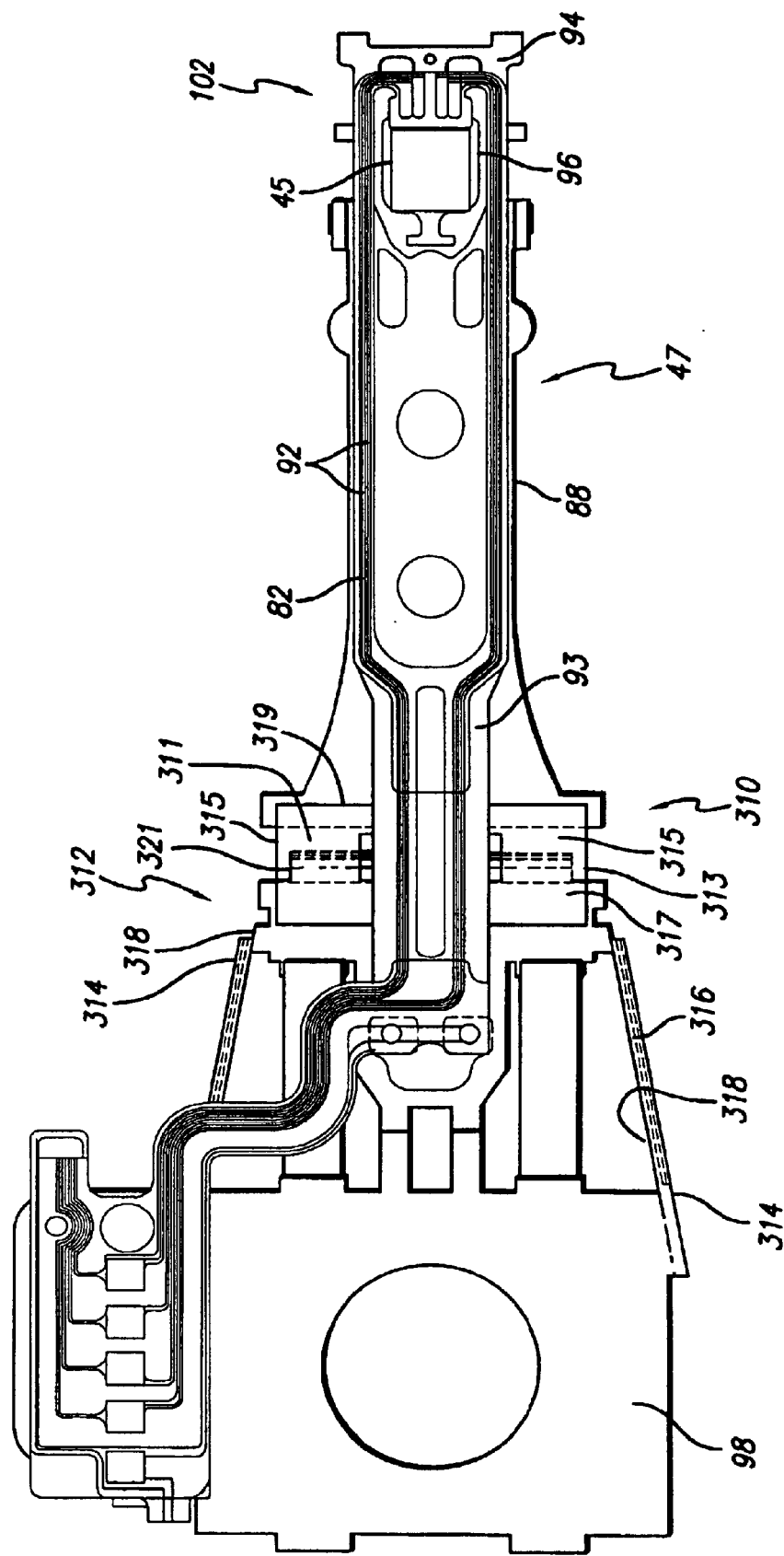

In FIG. 3, a further embodiment is shown in which like parts have like numbers plus 300. There, disk drive suspension 310 comprises a flexible circuit 82 comprising a laminate 88 of at least one pair of trace conductors 92, an insulative layer 93 of a plastic material or film, and a support layer 94 that defines a flexure 96 that carries slider (head) 45. Elongated suspension member 310 supports the flexible circuit 82. Suspension member 310 has a proximal end 98 adapted to be mounted to an actuator 45 and a distal end 102 supporting the flexure 96 to carry a read/write head (not shown) in operating proximity to a disk (not shown). Suspension member 310 comprises an assembly of juxtaposed first and second layers 314, 318 that are substantially inextendable by shear forces, at least one of the first and second layers being coupled to the distal end 102, and a third layer 316 between and attached to both the first and second layers. Third layer 316 is longitudinally variable in response to shear forces. An elongated microactuator 322 is arranged to relatively move the first and second layers 314, 318 in shear force imparting relation to the third layer 316 to relatively shift the first and second layers and thereby correspondingly shift the distal end 102 carried head relative to the disk.

In the FIG. 3 embodiment suspension member 310 includes a spring portion 311 having a proximate part 313 and a distal part 315. The member second outer layer 318 has a distal part 317 fixed to the proximate part 313 of the spring portion 311. The second outer layer distal part 317 acts on the spring portion distal part 315 through the spring portion 311 in response to relative movement of the 314 first outer layer and the second outer layer 318 across the third inner layer 316 effected by the microactuator 322.

The suspension 310 includes as well flexible circuit laminate 88 of trace conductors 92, an insulative plastic material layer or film 93 and a metal support layer 94. Metal support layer 94 conveniently but not necessarily defines the spring portion 311. In this embodiment, and the embodiments of FIGS. 1 and 2, a transverse stiffening element 321 is formed in the first outer layer 314 against curling of the suspension member 310 adjacent the spring portion 311.

The invention method of shifting a slider at a disk includes, with reference to FIG. 3, carrying a slider 45 on a suspension rigid portion 47, providing the rigid portion from a metal layer 314 of a laminate 312 having two metal layers 314, 318 and plastic layer 316 therebetween having movement in response to shear forces, coupling the two metal layers together with a microactuator 322 extending through the plane P of the plastic layer, and oppositely driving the rigid portion metal layers 314, 318 responsive to movement in shear in the plastic layer to shift the slider 45 at the disk (not shown) with the microactuator.

The invention thus provides a disk drive suspension using a laminate of first and second metal outer layers and a middle layer comprised of plastic such as polyimide, using one outer layer as or connected to the proximate portion of the suspension, and the other outer layer as or connected to the suspension distal portion, and coupling microactuators to the two outer layers while traversing the middle layer, and effecting relative movement between the outer layers without bending metal parts, only elongating or contracting the plastic middle layer, to cause microadjustment between the outer layers and thus the proximate and distal portions.

The foregoing objects are thus met.

I claim:

1. A microactuated disk drive suspension comprising a first outer layer-plastic layer-second outer layer laminate, said plastic layer extending in a plane, a dimensionally variable microactuator having first and second end regions and a middle region extending through said plastic layer plane, said first and second outer layers mounting said microactuator by its said first and second end regions respectively, whereby dimensional variations in said microactuator relatively shift said outer layers as a function of plastic layer movement in shear.

2. The microactuated disk drive suspension according to claim 1, in which said first outer layer comprises a metal.

3. The microactuated disk drive suspension according to claim 1, in which said second outer layer comprises a metal.

4. The microactuated disk drive suspension according to claim 1, in which said first and second outer layers comprise metal.

5. The microactuated disk drive suspension according to claim 1, in which said plastic material is a synthetic organic polymer.

6. The microactuated disk drive suspension according to claim 5, in which at least one of said first and second outer layers comprises a conductive metal.

7. The microactuated disk drive suspension according to claim 6, in which said plastic layer comprises a synthetic organic polymer.

8. The microactuated disk drive suspension according to claim 7, in which said synthetic organic polymer comprises repeating imide or acrylic moieties.

9. The microactuated disk drive suspension according to claim 7, in which said conductive metal comprises stainless steel, aluminum or copper.

10. The microactuated disk drive suspension according to claim 1, including also a second microactuator having first and second end regions, and a middle region extending through the plane of said plastic layer.

11. The microactuated disk drive suspension according to claim 1, in combination with a flexible circuit.

12. The microactuated disk drive suspension according to claim 1, in which said laminate is apertured to pass said microactuator through said plastic layer plane.

13. A microactuated disk drive suspension for supporting a read/write head at a disk, said suspension comprising an elongated member comprising a laminate of first and second outer layers of substantially inextendable material and a third inner layer of substantially extendable plastic material bonded to said first and second outer layers, said member having a proximate portion adapted to attach said member to an actuator, a distal portion adapted to support said read/write head, and an intermediate portion connected between said proximate and distal portions; and microactuator structure attached to said intermediate portion and connected to its said first and second outer metal layers for shifting said first and second outer metal layers relative to each other against the resistance to shear forces of said inner layer in a manner shifting said distal portion-carried read/write head relative to said disk.

14. The microactuated disk drive suspension according to claim 13, in which at least one of said outer layers is comprised of metal.

15. The microactuated disk drive suspension according to claim 14, in which said at least one of said outer layers comprises stainless steel, copper or aluminum.

16. The microactuated disk drive suspension according to claim 14, in which said member proximate portion comprises said first outer layer.

17. The microactuated disk drive suspension according to claim 14, in which said member distal portion comprises said second outer layer.

18. The microactuated disk drive suspension according to claim 17, in which said member distal portion further comprises said third inner layer, said third inner layer comprising plastic.

19. The microactuated disk drive suspension according to claim 18, in which said member distal portion further comprises said first outer layer, said first outer layer comprising a metal.

20. The microactuated disk drive suspension according to claim 19, including also a spring portion fixed between said proximate and said distal portions.

21. The microactuated disk drive suspension according to claim 20, including also a flexible circuit laminate comprising conductive traces, an insulative film layer and a metal support layer, said metal support layer defining said spring portion.

22. A microactuator suspension assembly comprising a load beam structure having side rails and comprising at least three layers of material in certain portions of the proximal area between the baseplate area and the spring area, the first and third layers comprising substantially inextensible metal, the second layer comprising extensible plastic, the plastic layer operating in shear when driven by an electrodynamically variable microactuator to extend or contract the length of said side rails.

23. A method of shifting a slider at a disk including carrying said slider on a suspension rigid portion, providing said rigid portion from a metal layer of a laminate having two metal layers and plastic layer therebetween having a resistance to movement in shear, coupling said two metal layers together with a microactuator extending through the plane of said plastic layer, and oppositely driving said rigid portion metal layers against the resistance to movement in shear in said plastic film layer to shift said slider at said disk with said microactuator.

* * * * *